United States Patent Office 3,417,143
Patented Dec. 17, 1968

3,417,143
IRRADIATION OF β,γ-UNSATURATED BICYCLIC-CYCLOHEXENONES TO FORM β,γ-UNSATURATED BICYCLIC-CYCLOBUTANONES
Herbert C. Kretschmar, Greenhills, Ohio, assignor to The Procter & Gamble Company, Cincinnati, Ohio, a corporation of Ohio
No Drawing. Filed June 13, 1966, Ser. No. 556,861
8 Claims. (Cl. 260—586)

ABSTRACT OF THE DISCLOSURE

Process for the preparation of bicyclic-cyclobutanones by irridiating bicyclic-cyclohexenones with ultraviolet light. The novel bicyclic-cyclobutanones are useful as perfume compositions.

This invention relates to an irradiation process for the preparation of novel bicyclic-cyclobutanones. More specifically, the invention involves the photochemical transformation of certain β,γ-unsaturated six-membered ring ketones (bicyclic-cyclohexenenones) to novel β,γ-unsaturated four-membered ring ketones (bicyclic-cyclobutanones). The saturated analogues of said β,γ-unsaturated bicyclic-cyclobutanones are novel compounds and are also a part of this invention.

It is therefore the principal object of this invention to provide a photochemical process for the preparation of heretofore unknown β,γ-unsaturated bicyclic-cyclobutanones.

Another object of this invention is to provide novel bicyclic-cyclobutanones having desirable and useful aromatic (odor) characteristics.

A more specific object of this invention is to provide the novel compounds bicyclo[4.1.1.]oct-2-en-8-one, bicyclo[5.1.1.]non-2-en-9-one, bicyclo[4.1.1.]octan-8-one, and bicyclo[5.1.1.]nonan-9-one.

The foregoing objects are achieved by a novel photochemical process, which comprises:

Irradiating a β,γ-unsaturated bicyclic-cyclohexenone compound of the formula

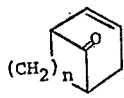

with ultraviolet light to produce a β,γ-unsaturated bicyclic-cyclobutanone compound of the formula

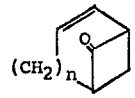

wherein n is an integer of 2 or 3.

The specific compounds (n=2 or 3) embodied by the above-described process are illustrated in Table 1.

Table 1

| β,γ-unsaturated bicyclic-cyclohexenone (starting material) | hν → ← | β,γ-unsaturated bicyclic-cyclobutanone (product) |
|---|---|---|
| n=2 bicyclo[3.2.1.]oct-2-en-8-one | | bicyclo[4.1.1.]oct-2-en-8-one |
| n=3 bicyclo[3.3.1.]non-2-en-9-one | | bicyclo[5.1.1.]non-2-en-9-one |

Bicyclo[3.2.1.]oct-2-en-8-one and bicyclo[3.3.1.]non-2-en-9-one, the β,γ-unsaturated bicyclic-cyclohexenone starting materials in the photochemical process of this invention (hereinafter referred to where appropriate as "the starting material") can be prepared by a multi-step synthesis starting with cyclopentanone or cyclohexenone respectively. More specifically, the process for the preparation of these starting materials is disclosed by Foote and Woodward in Tetrahedron 20, 687 (1964): Briefly, this process involves the reaction of morpholine with the cyclopentanone or cyclohexenone to form the corresponding morpholine enamine. This enamine is condensed with acrolein to produce a bicyclic-aminoketone. The ketone is protected by forming the ethylene ketal with ethylene glycol in acid media and the amino group is then oxidized with hydrogen peroxide to form the ketal-N-oxide. The ketal-N-oxide is pyrolyzed under reduced pressure to yield the olefinic ketal, which on acid treatment hydrolyzes to form the desired bicyclo starting material for this invention.

The last step of the above-described method of Foote and Woodward can be slightly modified according to the disclosure of Le Bel and Spurlock in Tetrahedron 20, 215 (1964), i.e., the hydrolysis of the ketal is effected by employing a two-phase system of ether and warm hydrochloric acid.

In carrying out the present photochemical rearrangement of the starting material to the β,γ-unsaturated bicyclocyclo-butanone product, any convenient source of ultraviolet radiation can be used, i.e., a light source that emits photo-energy at wavelengths between 250 mμ and 500 mμ. The wavelength of irradiation is preferably concentrated about the maximum absorption line of the starting material, i.e., at wavelengths between about 280 mμ and 320 mμ.

Commercially available mercury arc lamps having a total wattage ranging from about 100 watts to about 1,000 watts have the above-described spectral characteristics and are particularly preferred sources of the ultraviolet radiation.

It is preferable to use a Vycor or quartz reaction vessel during the irradiation. Ordinary glassware, e.g., Pyrex, tends to reduce transmission of wavelengths within the above-stated preferred range.

Preferably, a solvent is used as a medium for the irradiation reaction. Desirable solvents are those which dissolve the reacting materials to form a homogeneous system but are otherwise inert and do not substantially interfere with the transmission of the radiation.

Saturated hydrocarbons constitute a class of preferred solvents. Examples of suitable saturated hydrocarbon solvents include the alkanes, preferably of from 5 to 12 carbon atoms such as pentane, n-heptane, octane, dodecane or the like; and the cycloalkanes, preferably of from 5 to 8 carbon atoms such as cyclopentane, cyclohexane, cyclooctane and the like. Cyclohexane is a highly preferred solvent.

Ethers constitute another class of solvents for preferred use herein. Examples of suitable ether solvents include cyclic monooxy ethers such as tetrahydrofuran, cyclic dioxy ethers such as dioxane, aliphatic monooxy ethers such as diethyl ether, and aliphatic dioxy ethers such as ethylene glycol dimethyl ether or diethylene glycol dimethyl ether, all of said ether solvents preferably containing from 4 to 10 carbon atoms.

Alcohols constitute still another class of solvents that can be advantageously used herein. Examples of suitable alcohol solvents include aliphatic monohydric alcohols of from 1 to 10 carbon atoms such as methanol, ethanol, decyl alcohol and the like, and aliphatic dihydric alcohols of from 2 to 10 carbon atoms such as ethylene glycol.

The concentration of the starting material in the solvent preferably ranges from about 0.1% weight per unit volume to about 20% weight per unit volume, most preferably from about 0.5% weight per unit volume to about 10% weight per unit volume, with a concentration of about 1% weight per unit volume being especially desirable.

It is preferable to irradiate in an inert atmosphere such as nitrogen, argon, etc., to prevent oxidation, contamination and the like. To insure the uniform irradiation of the starting material, it is also preferable to bubble an inert gas, e.g., nitrogen, through the reaction medium to agitate continuously the material being irradiated. Preferably, the inert gas is bubbled through the reaction medium prior to the irradiation; this, desirably, tends to remove oxygen from the medium.

The irradiation reaction of this invention is primarily photochemical rather than thermodynamic in nature; thus the temperature employed can vary widely, e.g., from about 5° C. to about 60° C. A preferred temperature range for carrying out this reaction is from about 20° C. to about 30 C.

In the irradiation reaction of this invention, a photostationary state (equilibrium) exists between the starting material and the $\beta,\gamma$-unsaturated bicyclic-cyclobutanone product after a period of time. The weight proportion of product to starting material ranges from about 1:1 up to about 10:1 at equilibrium. More specifically, this proportion is generally within the range of from about 1:1 to about 3:1.

The time for the irradiation reaction to reach equilibrium is generally between about 5 minutes and about 25 hours, usually from about 10 minutes to about 2 hours. The reaction time varies with the concentration of the starting material in the solvent, the intensity of the radiation source, the identity of the reaction medium, the physical reaction conditions and the absorption of radiation by the reaction vessel. However, the course of the reaction can readily be followed by conventional techniques such as gas chromatography. It is preferable to stop the reaction when equilibrium is attained; further irradiation subsequent to this time can result in the formation of undesirable polymerization products.

The $\beta,\gamma$-unsaturated bicyclic-cyclobutanone irradiation products of the above-described process can be isolated from the reaction mixture by conventional techniques, e.g., by extraction, distillation, elution chromatography or gas-liquid chromatography. Specific methods of separating and purifying these products are found hereinafter in Examples I and III.

Mechanistically, the photochemical interconversion of $\beta,\gamma$-unsaturated bicyclic ketones in the irradiation reaction of this invention is believed to involve cleavage of the carbon-carbon bond located allyl to the double bond and alpha to the carbonyl in the starting material with subsequent double bond migration and recyclization resulting in the formation of the $\beta,\gamma$-unsaturated bicyclic-cyclobutanone product. The fact that a novel $\beta,\gamma$-unsaturated bicyclic-cyclobutanone product predominates at equilibrium as a result of this bond migration and recyclization is surprising and unexpected because this product is a more highly strained compound than the starting material due to the presence of the bicyclic-cyclobutanone ring structure. Also, as will be appreciated by those skilled in the art, the product distribution in a photochemical reaction such as the one described above is not predictable or explainable on the basis of ultraviolet absorption properties because both the starting material and the product exhibit similar $n \rightarrow \pi^*$ bands in the ultraviolet absorption spectra.

Novel bicyclic-cyclobutanones, which are the saturated analogues of the $\beta,\gamma$-unsaturated bicyclic-cyclobutanone products of the above-described irradiation reaction, have also been discovered as a part of this invention. These compounds are represented by the general formula

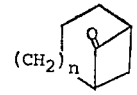

wherein $n$ is an integer of 2 or 3.

Specific compounds embodied by this formula are bicyclo-[4.1.1.]octan-8-one ($n=2$) and bicyclo[5.1.1.]nonan-9-one ($n=3$). These compounds can be respectively prepared from bicyclo[4.1.1.]oct-2-en-8-one and bicyclo-[5.1.1.]non-2-en-9-one by conventional hydrogenation techniques, e.g., reaction with hydrogen at an elevated temperature and pressure in the presence of a catalyst such as platinum, palladium or copper. More specific details for the preparation of these compounds are given hereinafter in Examples II and IV.

Thus, in summary, this invention provides, as a novel composition of matter, a bicyclic-cyclobutanone compound selected from the group consisting of bicyclo-[4.1.1.]oct-2-en-8-one, bicyclo[5.1.1.]non-2-en-9-one, bicyclo[4.1.1.]octan-8-one and bicyclo [5.1.1.]nonan-9-one.

The novel bicyclic-cyclobutanone compounds of this invention exhibit desirable and useful odors that are basically described as camphoraceous. More specifically, the $\beta,\gamma$ - unsaturated compounds, bicyclo[5.1.1.]non-2-en-9-one and bicyclo[4.1.1.]oct-2-en-8-one, exhibit a camphoraceous odor with a musky sweet background. The saturated analogues of these compounds, bicyclo[5.1.1.]nonan-9-one and bicyclo[4.1.1]octan-8-one, exhibit a woody turpentine-camphor odor with a melon side note.

All of the above bicyclic-cyclobutanones therefore have utility as components of perfume compositions or as odorants per se where a camphoraceous note is desired. For example, these compounds can be utilized in various perfume compositions for ultimate use in products such as soaps, detergents, deodorants and the like, wherein they can be used in odoriferously effective amounts to impart the above-described odors to said perfume compositions. For example, a perfume composition containing from about 0.00001% to about 100%, preferably from about 0.1% to about 50%, by weight of a bicyclic-cyclobutanone of this invention is highly desirable and useful. These compounds have particular utility in fougere perfume compositions [see The Givaudan Index, Second Edition, 1961, p. 381]. Further details of the perfume utility of these compounds are illustrated hereinafter in Examples V, VI and VII.

The following discussion is applicable to each of the following Examples I–IV. Melting points were determined on a Thomas-Hoover capillary melting point apparatus or on a micro hot stage and are expressed in degrees centigrade as are all other temperatures. Infrared spectra were recorded on a Perkin-Elmer Infracord spectrophotometer and ultraviolet spectra were obtained on a Perkin-Elmer Model 202 spectrophotometer. Nuclear magnetic resonance spectra were run as 10% solutions in carbon tetrachloride (unless stated otherwise) on a Varian A–60 or HA–100 spectrometer using tetramethylsilane as an internal reference. Chemical shifts are recorded as p.p.m. on the $\tau$ scale and coupling constants are recorded as c.p.s. Nuclear magnetic resonance data are recorded in the order: [chemical shift, spin coupling where $s$=singlet, $d$=doublet, $t$=triplet, $q$=quartet and $m$=multiplet (integration) interpretation]. Molecular weights were determined on a Bendix Model 12–100 Time-of-Flight mass spectrometer or on an Atlas CH–4 mass spectrometer. Gas chromatography separations were made on one of two columns unless otherwise stated: Column 1: a 10 ft., 0.25 in. stainless steel column packed with 20% General Electric SF–96 silicone on 70/80 mesh Chromosorb with H.M.D.S. (a conventional silicone coating); column 2: a 10 ft., 0.25 in. stainless steel column packed with 20% Reoplex-400 (a conventional polyester packing) on 60/80 mesh Chromosorb with H.M.D.S. Microanalyses were performed. All irradiations were performed in a conventional photochemical reaction flask equipped with a nitrogen flush and a Vycor immersion well. Nitrogen was bubbled through the reaction mixtures prior to and during the irradiations. The temperature was maintained in the range of 20° C.–30° C. by means of a water jacket. The source of ultraviolet radiation was a 200 watt Hanovia mercury arc lamp.

Example I.—Irradiation of bicyclo[3.1.1.]-non-2-en-9-one to form bicyclo-[5.1.1.]-non-2-en-9-one An oxygen-free, one percent solution (1.50 g. in 150 ml.) of bicyclo[3.3.1]non-2-en-9-one (M.P. 100°–101.5°) in cyclohexane was irradiated in a nitrogen atmosphere for one hour. The cyclohexane solution was passed through a column packed with 50 g. of silica gel and eluted with an additional 200 ml. of cyclohexane. Evaporation of the cyclohexane afforded 1.4 g. (93%) of soft crystals. Gas chromatography on column 2 at 130° with a helium flow of 60 ml. per minute showed four peaks: Peak #1 (1.0%): retention time 1 minute 30 seconds, unidentified Peak #2 (4%): retention time 9 minutes 25 seconds, infrared spectrum:

$$\lambda_{max.}^{CH_2Cl_2} 5.80 \text{ (carbonyl) unidentified}$$

Peak #3 (29%) bicyclo [3.3.1.]non-2-en-9-one (starting material): retention time 12 minutes 20 seconds. Peak #4 (67%) bicyclo[5.1.1.]-non-2-en-9-one (product): retention time 13 minutes 10 seconds. This compound had a camphoraceous odor with a musky sweet background. A sample of the same compound was collected by preparative gas-liquid chromatography and showed M.P. 75.0–76.0, infrared spectrum:

$$\lambda_{max.}^{CCl_4} 5.61 \text{ (carbonyl)}$$

$\lambda_{max.}$ 13.94 (cis olefin). Ultraviolet spectrum:

$$\lambda_{max.}^{EtOH} 2.99 \text{ mm., } \epsilon_{max.} 45$$

N.M.R. spectrum: $\tau$, 3.8–4.65 (m) [1.9] olefinic protons, $\tau$, 6.2–6.9 (m) [1.8] bridgehead protons, $\tau$, 7.3–8.5 (m) [8.2] four methylene protons, 2 allyl protons, two bridgehead protons.

Analysis.—Calculated for $C_9H_{12}O$: C, 79.3; H, 8.9. Found: C, 79.0; H, 8.9.

In the above example, substantially equivalent results are obtained in that bicyclo[5.1.1.]non-2-en-9-one is formed when the irradiation is stopped at reaction equilibrium and the cyclohexane solvent is replaced by a hydrocarbon solvent selected from the group consisting of alkanes of from 5 to 12 carbon atoms, e.g., n-heptane, octane or dodecane, and cyclo-alkanes of from 5 to 8 carbon atoms, e.g., cyclopentane.

Example II.—Hydrogenation of bicyclo[5.1.1.]non-2-en-9-one to form bicyclo-[5.1.1.]nonan-9-one A solution of 968 mg. of the mixture obtained from the irradiation of bicyclo[3.3.1.]non-2-en-9-one in Example I above, i.e., a mixture containing 67% bicyclo[5.1.1.] non-2-en-9-one, in 20 ml. of absolute ethanol was hydrogenated in the presence of 20 mg. of 5% palladium-on-charcoal catalyst in a Parr low pressure hydrogenator at 50 p.s.i. initial hydrogen pressure with shaking for a period of one hour. The catalyst was removed by filtration and the ethanol evaporated under reduced pressure to yield 645 mg. (67%) of a white semi-solid. Gas chromatography on column 2 at 130° with a helium flow of 70 ml. per minute showed four peaks. Peak #1 (3%): retention time 12 minutes 0 seconds, unidentified. Peak #2 (47%) bicyclo-[5.1.1.]nonan-9-one (product): retention time 16 minutes 15 seconds. This compound had a woody turpentine-camphor odor with a melon side note. A sample of this same compound was collected by preparative gas-liquid chromatography and showed M.P. 96°–98°, infrared spectrum:

$$\lambda_{max.}^{CCl_4} 5.60 \text{ (carbonyl)}$$

N.M.R. spectrum: $\tau$, 6.6–7.2 (m) [2] tertiary bridgehead protons adjacent to carbonyl, $\tau$, 7.7–8.7 (m) [12] methylene protons.

Analysis.—Calculated for $C_9H_{14}O$: C, 78.2; H, 10.2. Found: C, 78.0; H, 10.2. Peak #3 (41%): retention time 18 minutes 40 seconds, bicyclo[3.3.1.]nonan-9-one. Peak #4 (10%): retention time 26 minutes, unidentified.

Example III.—Irradiation of bicyclo[3.2.1]oct-2-en-8-one to form bicyclo[4.1.1.]oct-2-en-8-one An oxygen-free solution of 1.00 g. of bicyclo[3.2.1.]-oct-2-en-8-one in 100 ml. of cyclohexane was irradiated in a nitrogen atmosphere for 90 minutes. Evaporation of the cyclohexane afforded 950 mg. (95%) of light yellow liquid. Gas chromatography on a 10 ft., 0.25 in. column packed with 20% ethylene glycol succinate polymer on 60/80 mesh Chromosorb with H.M.D.S. with a helium flow of 60 m./min. at 150° showed 5 peaks. Peak #1 (7%): retention time 6 minutes 30 seconds, unidentified. Peak #2 (18%): retention time 7 minutes 20 seconds, unidentified. Peak #3 (27%): retention time 11 minutes 40 seconds, bicyclo[3.2.1.]oct-2-en-8-one (starting material). Peak #4 (46%): retention time 13 minutes 0 seconds, bicyclo[4.1.1.]oct-2-en-8-one (product). This compound had a camphoraceous odor with a musky sweet background. A sample of this same compound was collected by preparative g.l.c. and showed infrared:

$$\lambda_{max.}^{film} 5.6 \text{ (carbonyl)}$$

$\lambda_{max.}$ 6.1, 13.5, 13.9 (cis-olefin). N.M.R.: $\tau$, 4.0–4.5 (m) [1.89], $\tau$, 6.3–6.8 (m) [1.89], $\tau$, 7.2–8.4 (m) [6.26].

Analysis.—Calculated for $C_8H_{10}O$: C, 78.65; H, 8.25. Found: C, 77.7, H, 7.9. The 2,4-dinitrophenylhydrazone of this compound was recrystallized from ethanol in needles, M.P. 153.5°–155.5°. Peak #5 (3%): retention time 19 minutes 20 seconds, unidentified.

In this example, substantially equivalent results are obtained in that bicyclo[4.1.1.]oct-2-en-8-one is formed when the cyclohexane solvent is replaced by a solvent selected from the group consisting of: ethers of 4 to 10 carbon atoms, e.g., cyclic monooxy ethers such as tetrahydrofuran, cyclic dioxy ethers such as dioxane, aliphatic monooxy ethers such as dioxane, and aliphatic dioxy ethers such as ethylene glycol dimethyl ether or diethylene glycol dimethyl ether; and alcohols, e.g., aliphatic monohydric alcohols of from 1 to 10 carbon atoms such as methanol and ethanol, and aliphatic dihydric alcohols of from 2 to 10 carbon atoms such as ethylene glycol.

Example IV.—Hydrogenation of bicyclo[4.1.1.]oct-2-en-8-one to form bicyclo[4.1.1]-octan-8-one 1.000 g. of a photolysis mixture obtained from the irradiation of bicyclo[3.2.1.]oct-2-en-8-one in the same manner as in Example III above (this mixture contained 37% bicyclo[4.1.1.]oct-2-en-8-one and 53% bicyclo[3.2.1.]oct-2-en-8-one), was dissolved in 20 ml. of absolute ethanol mixed with 0.020 g. of 5% palladium-on-charcoal catalyst and shaken in a Parr low pressure hydrogenator under 50 p.s.i. of hydrogen for two hours. The catalyst was removed by filtration and the ethanol evaporated to yield 800 mg. of light yellow liquid. Gas chromatography of this liquid on a 10 ft., 0.25 in. diameter column packed with 20% ethylene glycol succinate polymer on 60/80 mesh Chromosorb with H.M.D.S. with a helium flow of 65 ml. per minute at 150° showed five peaks: Peak #1 (2%): retention time 3 minutes 30 seconds, unidentified. Peak #2 (6%): retention time 4 minutes 45 seconds, unidentified. Peak #3 (36%): retention time 6 minutes 40 seconds, bicyclo[4.1.1.] octan-8-one (product). This compound has a woody turpentine-camphor odor with a melon side note. A sample of the same compound was collected by preparative g.l.c. as a colorless liquid and the infrared spectrum showed

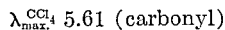
$\lambda_{max}^{CCl_4}$ 5.61 (carbonyl)

the N.M.R. spectrum showed signals at $\tau$, 6.5–7.0 (multiplet) [1.8 protons] bridgehead protons, $\tau$, 7.9–8.7 (multiplet) two cyclobutane and eight methylene protons. This compound was analyzed as its 2,4-dinitrophenylhydrazone derivative, M.P. 164°–165° after one recrystallization from ethanol.

*Analysis.*—Calculated for $C_{14}H_{16}O_4N_4$: C, 55.2; H, 5.30; N, 18.4. Found: C, 55.2; H, 6.1; N, 18.8. Peak #4 (55%): retention time 7 minutes 55 seconds, bicyclo[3.2.1.]octan-8-one. Peak #5 (0.9%): retention time 9 minutes 15 seconds, unidentified.

Example V.—Perfume compositions

A perfume composition is prepared by intermixing the components shown below:

| | |
|---|---|
| Bergamot | 12.0 |
| Bois de Rose | 8.0 |
| Cassia | 1.0 |
| Cedarwood | 9.0 |
| Coumarin | 4.0 |
| Labdanum Resin | 2.0 |
| Lavender | 44.0 |
| Musk Xylol | 6.0 |
| Patchouli | 4.0 |
| Spike Lavender | 5.0 |
| Bicyclo[5.1.1.]nonan-9-one | 3.0 |
| Bicyclo[5.1.1.]non-2-en-9-one | 2.0 |

This perfume composition exhibits a highly desirable and useful odor characterized as fougere. A substantially equivalent perfume composition is obtained when bicyclo[4.1.1.]octan-8-one and bicyclo[4.1.1.]oct-2-en-8-one are respectively substituted for the bicyclo[5.1.1.]nonan-9-one and the bicyclo[5.1.1.]non-2-en-9-one. As discussed hereinbefore, the bicyclo-cyclobutanones of this invention are useful in various perfume compositions. Thus, the components and proportions in the perfume composition of this example can be adjusted according to methods well known in the perfume art to form a wide variety of desirable perfume compositions containing odoriferously effective amounts of a compound selected from the group consisting of bicyclo[4.1.1.]oct-2-en-8-one, bicyclo[5.1.1.]non-2-en-9-one, bicyclo[4.1.1.]octan-8-one, bicyclo[5.1.1.]nonan-9-one, and mixtures thereof.

Example VI.—Detergent compositions

A conventional heavy-duty built detergent having the following composition is prepared:

| Ingredient: | Percent by weight |
|---|---|
| Sodium dodecyl benzene sulfonate | 20.00 |
| Sodium tripolyphosphate | 50.00 |
| Sodium silicate | 6.00 |
| Sodium sulfate | 14.00 |
| Water | 9.80 |
| Perfume composition of Example V | 0.20 |

This detergent composition exhibits a highly desirable fougere odor. Other perfume compositions employing odoriferously effective amounts of a compound selected from the group consisting of bicyclo[4.1.1]oct-2-en-8-one, bicyclo[5.1.1]non-2 - en-9-one, bicyclo[4.1.1]octan-8-one, bicyclo[5.1.1]nonan-9-one, and mixtures thereof, can be substituted for the perfume composition in the detergent composition of this example according to methods well known in the perfume art.

Example VII.—Detergent bar compositions

A conventional household detergent bar having the following composition is prepared:

| Ingredient: | Percent by weight |
|---|---|
| Sodium soap | 75.00 |
| Potassium soap | 7.50 |
| (The total soap comprises a mixture of 80% tallow soap and 20% coconut soap.) | |
| Water | 15.00 |
| Perfume composition of Example V | 2.50 |

This detergent bar exhibits a highly desirable fougere odor. Other perfume compositions employing odoriferously effective amounts of a compound selected from the group consisting of bicyclo [4.1.1]oct-2-en-8-one, bicyclo[5.1.1]non-2-en-9-one, bicyclo[4.1.1]octan-8-one, bicyclo[5.1.1]nonan-9-one, and mixtures thereof, can be substituted for the perfume composition in the detergent bar composition of this example according to methods well known in the perfume art.

What is claimed is:
1. A photochemical process, which comprises:
    dissolving a $\beta$, $\gamma$-unsaturated bicyclic-cyclohexenone compound of the formula

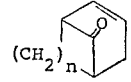

in an inert solvent to form a homogeneous system, irradiating said cyclohexanone compound with ultraviolet light at a temperature of from about 5° C. to about 60° C. to produce a $\beta,\gamma$-unsaturated bicyclic-cyclobutanone compound of the formula

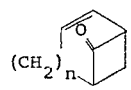

wherein $n$ is an integer selected from the group consisting of 2 and 3.
2. The photochemical process of claim 1 wherein the irradiation is carried out in a solvent selected from the group consisting of hydrocarbons, ethers and alcohols.

3. The process of claim 2 wherein the irradiation is stopped at equilibrium.

4. The process of claim 2 wherein the irradiation product is separated from the starting material.

5. The process of forming saturated bicyclo-cyclobutanones by hydrogenating the irradiation products of claim 1, in the presence of a catalyst selected from the group consisting of platinum, palladium, and copper, said hydrogenation taking place at an elevated temperature and pressure.

6. Bicyclo[5.1.1]non-2-en-9-one.

7. Bicyclo[4.1.1]oct-2-en-8-one.

8. Bicyclo[4.1.1]octan-8-one.

References Cited

Gutsche et al.: "J. Am. Chem. Soc.," vol. 82, p. 4067 (1960).

Hurst et al.: "Proceedings of the Chem. Soc. (London), p. 160 (1959).

LEON ZITVER, *Primary Examiner.*

M. JACOB, *Assistant Examiner.*

U.S. Cl. X.R.

204—158; 167—94; 252—89, 108